United States Patent
Luo et al.

(10) Patent No.: US 12,520,134 B2
(45) Date of Patent: Jan. 6, 2026

(54) MUTUAL AUTHENTICATION AND ENCRYPTION KEY GENERATION IN WIRELESS AMBIENT POWER (AMP) DEVICES

(71) Applicant: Cypress Semiconductor Corporation, San Jose, CA (US)

(72) Inventors: Hui Luo, Marlboro, NJ (US); Rakesh Taori, McKinney, TX (US)

(73) Assignee: Cypress Semiconductor Corporation, San Jose, CA (US)

( * ) Notice: Subject to any disclaimer, the term of this patent is extended or adjusted under 35 U.S.C. 154(b) by 169 days.

(21) Appl. No.: 18/441,391

(22) Filed: Feb. 14, 2024

(65) Prior Publication Data
US 2025/0234191 A1 Jul. 17, 2025

Related U.S. Application Data

(60) Provisional application No. 63/620,666, filed on Jan. 12, 2024.

(51) Int. Cl.
| | |
|---|---|
| *H04L 21/00* | (2006.01) |
| *H04W 12/037* | (2021.01) |
| *H04W 12/0433* | (2021.01) |
| *H04W 12/06* | (2021.01) |

(52) U.S. Cl.
CPC ..... *H04W 12/0433* (2021.01); *H04W 12/037* (2021.01); *H04W 12/06* (2013.01)

(58) Field of Classification Search
CPC ........... H04W 12/0433; H04W 12/037; H04W 12/06; H04W 12/041; H04W 12/08
See application file for complete search history.

(56) References Cited

U.S. PATENT DOCUMENTS

| | | | | |
|---|---|---|---|---|
| 2015/0185716 A1* | 7/2015 | Wichmann | ................ | F02C 9/28 700/287 |
| 2018/0283913 A1* | 10/2018 | Chen | ...................... | G01D 21/00 |
| 2024/0357348 A1* | 10/2024 | Saini | ...................... | H02J 50/20 |

OTHER PUBLICATIONS

Schurmann et al., "determine frame exchange parameter using a secret key by an ambient power device", IEEE Transactions on Mobile Computing, vol. 12, No. 2, Feb. 2013.*

* cited by examiner

*Primary Examiner* — Morshed Mehedi (57) ABSTRACT

A method for receiving, by an ambient power (AMP) device that harvests environmental energy, an identification (ID) request frame from a powered wireless device. The ID request frame includes one or more frame-exchange parameters and an authentication and key management (AKM) method. The method includes retrieving, from memory, a secret that is shared with the powered wireless device, determining, using the secret, one or more first AKM parameters, and transmitting, to the powered wireless device, by the AMP device, an ID response frame including an ID of the AMP device, at least one of the one or more frame-exchange parameters and the one or more AKM parameters with which the powered wireless device is to be mutually authenticated with the AMP device and to generate an encryption key to initiate an encrypted wireless communication session.

20 Claims, 6 Drawing Sheets

MUTUAL AUTHENTICATION AND ENCRYPTION KEY GENERATION IN WIRELESS AMBIENT POWER (AMP) DEVICES

CLAIM OF PRIORITY

The present application claims the benefit under 35 U.S.C. § 119(e) of U.S. Provisional Patent Application No. 63/620,666, filed Jan. 12, 2024, which is incorporated by this reference herein.

TECHNICAL FIELD

This disclosure relates to wireless devices and, more specifically, to mutual authentication and encryption key generation in wireless ambient power (AMP) devices.

BACKGROUND

Radio frequency (RF) wireless devices have grown in type and capability. In some wireless local area networks (WLANs), ambient power (AMP) devices, which harvest energy from the environment, can be effectively deployed as low cost wireless data collection sensors. Some use cases include tagging containers of retail products traveling from and between warehouses and tagging luggage being transported from and between air transportation and within airports. Other use cases include tracking or reporting environmental data such as temperature, proximity, pressure, or light data collected by a sensor. Due to the limited power available for processing incoming requests, communications with AMP devices are not secured. For example, often even low-power secured communication links require minimal data frame transfer rates to maintain a secured communication link. Thus, AMP devices that harvest energy from the environment may not be able to guarantee sufficient power to maintain a secured communication link.

DETAILED DESCRIPTION

The following description sets forth numerous specific details such as examples of specific systems, devices, components, methods, and so forth, in order to provide a good understanding of various embodiments of mutual authentication and encryption key generation in wireless ambient power (AMP) devices. Some wireless AMP devices, e.g., AMP wireless clients, are simple wireless devices needing little processing power and memory, and thus can operation with little power. These AMP devices harvest (or scavenge) energy from the environment sufficient for brief and reduced processing. For example, AMP devices may communicate an identifier (ID) and/or other data being gathered by a sensor of or coupled to the AMP device. Powered wireless devices, such as routers, access points, client devices, etc., may be so referenced within mesh networks because the devices are receiving external continuous power, in contrast to AMP devices which do not receive continuous external power.

As discussed previously, due to the limited power available for receiving and processing incoming requests, as well as processing and transmitting outgoing responses, communication sessions with AMP devices are often unencrypted. Often, establishing and maintaining an encrypted communication session requires each device participating in the encrypted communication session to maintain constant communication. This type of constant communication is not always possible or feasible for an AMP device. Further, typical communication in a WLAN between wireless clients and powered wireless devices requires extensive handshake protocols to ensure authentication and verification of connected devices (e.g., to establish a secured network or wireless communication session) in addition to encryption of data exchanged between the AMP wireless clients and powered wireless devices (e.g., once the secured wireless communication session is established). For example, many encryption methods can require two devices to transmit several frames of data in order to authorize each device, then several frames to establish an encryption (e.g., determine respective encryption keys) and then one or more frames to transmit and receive encrypted data. These more extensive protocol-based attachment methods are inconsistent with the low-power nature of the AMP devices due to the amount of power required. Without encryption, AMP devices may not be deployed in many practical settings, due to the risk of transmitting and receiving unencrypted data, which risks are increasingly of concern related to Internet of Things (IoT) devices.

Aspects of the present disclosure resolve these and other deficiencies with known approaches to employing AMP devices in WLAN-based systems, by providing a method for mutual authentication and encryption key generation in wireless ambient power (AMP) devices. In some embodiments, the present disclosure provides various methods and systems in which powered wireless devices can initiate and establish an encrypted communication session with an AMP device with a minimal exchange of data exchange frames. In some embodiments, authentication and key generation may be embedded in a brief data exchange, thus eliminating the need for any extra frame exchanges for establishing a secure association state.

For example, in some embodiments, the powered wireless device generates an encryption key before mutual authentication, just at the time when the powered wireless device needs the encryption key to encrypt a data request frame. Later, the powered wireless device-to-AMP device authentication can be performed at the AMP device after the AMP device receives the encrypted data request frame. In the same manner, key generation at the AMP device can be performed before mutual authentication, just at the time when the AMP device needs the encryption key to encrypt a data response frame. Later, the AMP device-to-powered wireless device authentication can be performed at the powered wireless device after receiving the data response frame. At this point, in at least some embodiments, the one-shot encrypted data exchange finishes and the mutual authentication finishes at the same time.

In some embodiments, for example, authentication information and encryption key information is embedded into the data exchange frames that contain encrypted data. In this way, authentication between the devices can be accomplished at the same time that encrypted data is transmitted, thus reducing the quantity of frames required to transmit/receive an authenticated and encrypted communication. That is, the AMP device can receive encrypted data from the powered wireless before the AMP device has authorized the powered wireless device, and similarly, the powered wireless device can receive encrypted data from the AMP device before the powered wireless device has authorized the AMP device.

More specifically, the AMP device can receive encrypted data from the powered wireless device alongside authorization information for the powered wireless device. The AMP device can authorize the powered wireless device as an authorized sender, decrypt the encrypted data, and send encrypted data and authorization information to the powered wireless device in a quick series of low-power processing operations. This series of quick operations can reduce the time the AMP device needs to maintain power. The powered wireless device can receive encrypted data from the AMP device, authorize the AMP device as an authorized sender, and decrypt the encrypted data.

In some embodiments, for example, an AMP device is configured to receive an identification request frame from a powered wireless device. After the identification request frame has been verified by the AMP device, the AMP device uses a shared secret to determine authentication and key management (AKM) parameters. The shared secret can be a secret that is shared between the AMP device and the powered wireless device. In some embodiments, the shared secret is negotiated based on a networking protocol, pre-programmed to the AMP device and/or powered wireless device during manufacturing, or otherwise configured before deployment of the AMP device and/or powered wireless device in an operational network. The AMP device can send the AKM parameters to the powered wireless device, which can use the AKM parameters to mutually authenticate and generate an encryption key for an encrypted wireless communication session with the AMP device. In some embodiments, the AMP device can further receive a data request, and transmit a respective data response.

In related embodiments, for example, a powered wireless device is configured to transmit an identification request frame to an AMP device. The powered wireless device can receive an identification response frame from the AMP device that includes the first AKM parameters. After the identification response frame is verified, the powered wireless device can determine one or more second AKM parameters using the shared secret with the AMP device and using the first AKM parameters. The powered wireless device can then use the second AKM parameters to generate an encryption key for use in establishing an encrypted wireless communication session with the AMP device. In some embodiments, the powered wireless device can further transmit a data request, and receive a respective data response using a similar approach that will be discussed in more detail.

Advantages of the present disclosure include, but are not limited to, providing for encrypted communication sessions between powered wireless devices and AMP devices within a WLAN-based system, despite the fact that the AMP devices are able to operate infrequently, at low power, and with minimal stored data. Additional advantages will be apparent to those skilled in the art of WLAN-related data collection and tracking systems that employ AMP devices, and are further discussed below.

Figure 1A:
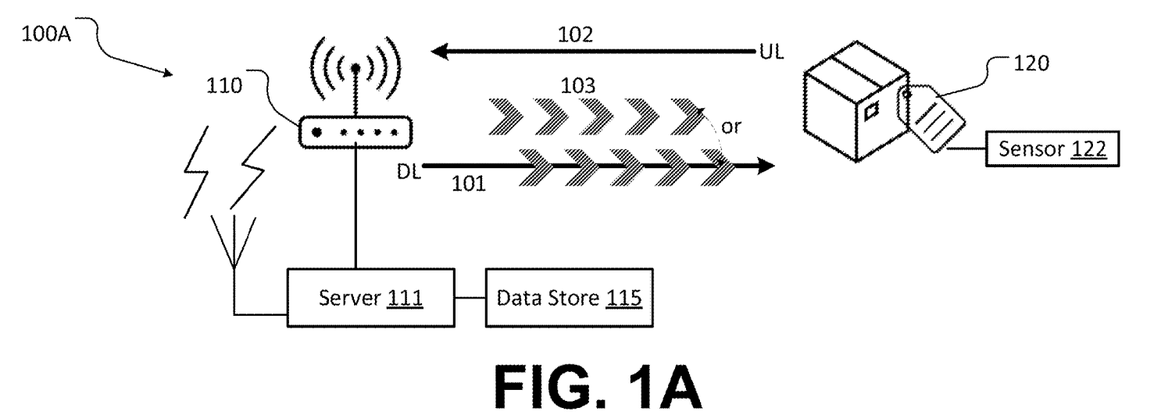
FIG. 1A is a block diagram of an exemplary wireless network configured with RF band arrangements for downlink and uplink transmissions between a powered wireless device and an AMP device according to various embodiments.

FIG. 1A is a block diagram of an exemplary wireless network 100A configured with RF band arrangements for downlink (DL) and uplink (UL) transmissions between a powered wireless device 110 and an AMP device 120, e.g., AMP client wireless device, according to various embodiments. In some embodiments, the powered wireless device 110 is an access point, a router, a wireless hub, a mobile hotspot device, or a wireless (or cellular) base station, a client device, or the like that is externally powered. In various embodiments, the AMP device 120 is a wireless identification tag or a low-power client wireless device or AMP station (STA).

In some embodiments, the powered wireless device 110 communicates to a WLAN server 111 to upload data to a cloud. In these embodiments, the WLAN server 111 includes or is coupled to a data store 115 of volatile or non-volatile memory, e.g., within cloud-based storage that exists in a local cloud or edge cloud or the like. In this way, data/information collected by the powered wireless device 110 can be stored, by the WLAN server 111, in the data store 115 where the data can optionally be indexed against respective AMP devices 120 e.g., in a database or the like. In various embodiments, the data or information collected and stored includes an identification and/or a location of the AMP device 120, temperature data, humidity data, pressure data, level data (e.g., level of fluid or gas within a container), and/or other data associated with an environment of the AMP device 120. In some embodiments, the data or information is a log or array of information to include a data history of the AMP device 120 that includes environmental data or information collected over time. The sensor-related data may be detected from a sensor 122 (or multiple sensors) included within or coupled to the AMP device 120.

In many embodiments, there are one or more powered wireless devices 110 and many client wireless devices, which are AMP devices 120, as disclosed herein. Ambient power (AMP) devices are energized by harvesting energy from RF signals (e.g., RF-related power sources) and/or from non-RF-related power sources (e.g., the AMP device can harvest environmental energy). In various embodiments, harvested energy from RF-related power sources are from in-band RF power sources (e.g., within the same RF band being used for downlink/uplink (DL/UL) transmissions) or out-of-band RF power sources (e.g., downlink (DL) and uplink (UL) transmissions take place in different RF bands compared to RF band being used for energy harvesting). In additional embodiments, as will be illustrated with reference to FIG. 1B, non-RF-related power sources include solar or photovoltaic cells (convert ambient sunlight into electricity), thermoelectric generators (convert temperature gradients into electricity), vibration energy harvesting using piezoelectric, electrostatic, and electromagnetic converters (convert mechanical vibrations from the environment into electricity), miniature wind turbines (convert ambient wind energy into electrical power), pressure differential energy harvesting, dynamos or wearable harvesters (convert human or animal motion into electrical energy), and other such energy-harvesting mechanisms. In some embodiments, the AMP device can harvest environmental energy using one or more collection circuits (e.g., AMP collection circuits). The collection circuits can include circuitry that can harvest any of the above-mentioned electrical potential energy (e.g., the collection circuit can be configured to harvest environmental energy).

With additional reference to FIG. 1A, in at least one embodiment, the powered wireless device 110 transmits a first wireless signal (101), which is a DL transmission, over a first RF band to the AMP device 120. In some embodiments, the first wireless signal includes a data packet requesting information from the AMP device 120. The AMP device 120 may receive the first wireless signal and parse the data packet to determine the requested information.

In these embodiments, the AMP device 120 transmits a second wireless signal (102), which is an UL transmission, over a second RF band to the powered wireless device 110 with a data packet with the requested information. In this way, the requested information or data (discussed previously) may be requested and received from the AMP device 120 through data packet exchange. In various embodiments, the powered wireless device 110 generates the first wireless signal employing technology such as Wi-Fi®, Bluetooth®, Bluetooth® Low Energy, Ultra-Wideband (UWB), Z-Wave™, Zigbee®, LoRa™, Wi-SUN®, or other wireless protocol. In various embodiments, the AMP device 120 generates the second wireless signal employing technology such as Wi-Fi®, Bluetooth®, Bluetooth® Low Energy, Ultra-Wideband (UWB), Z-Wave™, Zigbee®, LoRa™, Wi-SUN®, or other wireless protocol.

In some embodiments, the first RF band for DL transmission differs from the second RF band used for UL transmission. In some embodiments, the second RF band operates at a lower frequency range than that of the first RF band, e.g., as low frequencies consume less power. Lower frequencies also exhibit smaller path losses compared to higher frequencies and, at the same power, the wireless signals can be adequately received and decoded at a farther distance and propagate through or around obstacles better compared to higher frequencies. Further, RF and circuit design at lower frequencies can be far less complex compared to being designed for at higher frequency operation, keeping costs low for the AMP devices.

In some embodiments, the second RF band operates at a higher frequency range than that of the first RF band, e.g., higher frequency operations deploy wider channel bandwidths, which in turn allow a transmission of the same number of user bytes and finish earlier. The AMP device 120 may then receive and/or transmit for a shorter period of time, conserving power and providing a separate power consumption benefit. Accordingly, use of a higher frequency range or a lower frequency range with the UL transmission (compared to the DL transmission) may involve a cost-benefit analysis that weighs these benefits as between higher or lower frequency ranges.

In other embodiments, the first RF band is the same as the second RF band, but the DL transmission and the UL transmission occur over different frequencies with significant separation (e.g., more than a few 100 megahertz (MHz) within that same RF band. In these ways, both the technology and RF bands (or frequencies) can differ as between the DL/UL transmissions so that AMP devices can operate at lower power while avoiding frequency conflicts between the DL and UL transmissions.

In various embodiments, the first wireless signal (101), e.g., transmitted in the first RF band, is also an energizing RF signal, illustrated with thick directional indicators, from which the AMP device 120 harvests environmental energy. In similar embodiments, the powered wireless device 110 instead transmits a separate energizing RF signal (103) towards the AMP device 120, but this separate energizing RF signal (103) is also within the first RF band, e.g., is not necessarily the same as the first wireless signal (101), but may be close in frequency. In alternative embodiments, the separate energizing RF signal (103) is transmitted over the second RF band, e.g., of the UL transmission, or is transmitted over an entirely different third RF band. Accordingly, in differing embodiments, the energizing RF signal (103) is sent over the first RF band, the second RF band, or the third RF band. For example, in some embodiments by way of example, the first RF band is 5.0 gigahertz (GHz), the second RF band may be 2.4 GHz, and the third RF band may be 5.0 or 6.0 GHz, where the third RF band may also be employed by the powered wireless device 110 to communicate with other mobile stations (STA).

Figure 1B:
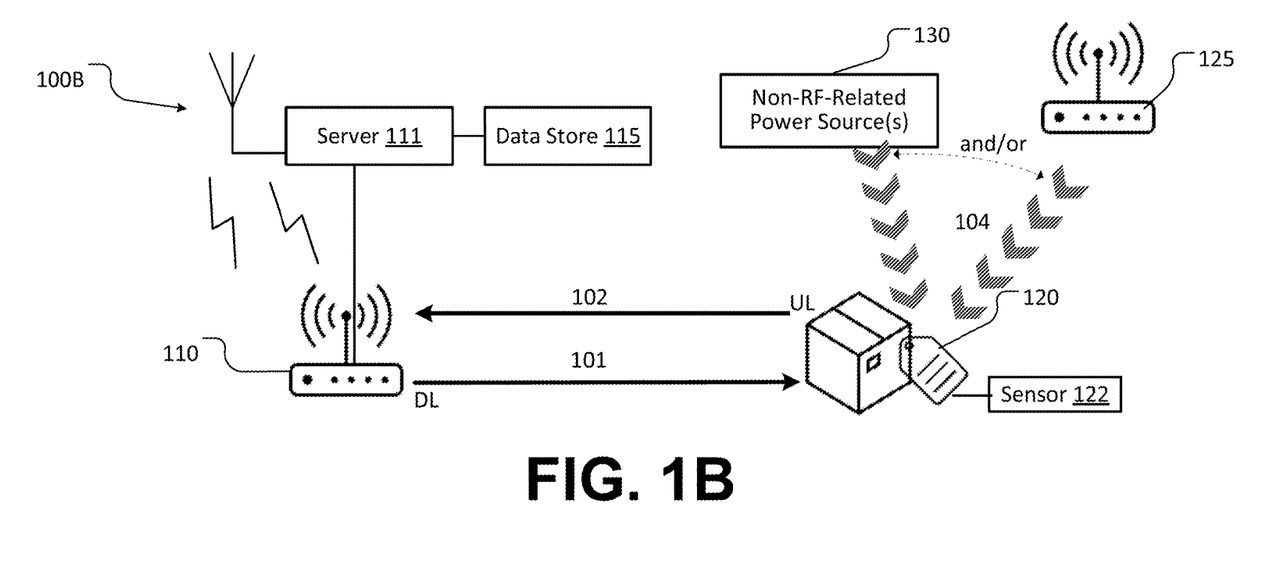
FIG. 1B is a block diagram of an exemplary wireless network configured with RF band arrangements for downlink and uplink transmissions between a powered wireless device and an AMP device according to other embodiments.

FIG. 1B is a block diagram of an exemplary wireless network 100B configured with RF band arrangements for DL and UL transmissions between the powered wireless device 110 and the AMP device 120 according to other embodiments. In some embodiments, the powered wireless device 110 does not transmit the energizing RF signal. For example, in other embodiments, the wireless network 100B further includes a second powered wireless device 125 and/or non-RF-related power sources 130 that provide RF power and/or non-RF power, respectively, from which the AMP device 120 harvests environmental energy (e.g., from power sources other than from the powered wireless device 110 associated with the DL/UL transmissions). Possible non-RF-related power sources were previously discussed. In some embodiments, the second powered wireless device 125 is a cellular base station operating in licensed or shared frequency bands.

TABLE 1

| Energizing AMP STAs (Signal 103 or Signal 104) | DL Transmissions (Signal 101) | UL Transmissions (Signal 102) | Notes: |
|---|---|---|---|
| Band X (e.g., 900 MHz) | Band X (e.g., 900 MHz) | Band X (e.g. 900 MHz) | RF band for energy harvesting same as the RF band used for DL/UL |
| Band X (e.g. 900 MHz) | Band Y (e.g., 2.4 GHz) | Band Y (e.g., 2.4 GHz) | RF band for energy harvesting different from RF band used for DL/UL |
| Band X (e.g. 900 MHz) | Band X (e.g. 5 GHz) | Band Y (e.g., 900 MHz) | DL/UL on different bands; RF band for energizing is same as RF band for DL |
| Band X (e.g. 2.4 GHz) | Band Y (e.g., 6 GHz) | Band X (e.g., 2.4 GHz) | DL/UL on different bands; RF band for energizing is same as RF band for UL |
| Band X (e.g. 2.4 GHz) | Band Y (e.g., 5 GHz) | Band Z (e.g., 900 MHz) | All 3 bands are different |

In at least some embodiments, the second powered wireless device 125 transmits an energizing RF signal (104) towards the client wireless device from which the client wireless device harvests energy. In various embodiments, the energizing RF signal (104) is transmitted over one of the first RF band, the second RF band, or a third RF band. In some embodiments, the energizing RF signal (104) is transmitted as a continuous wave (CW) or using technology including Bluetooth®, Bluetooth® Low Energy, Wi-Fi®, or Zigbee®. In further embodiments, the energizing signals (101) or (103) discussed with reference to FIG. 1A are combined with the energizing RF signal (104) of FIG. 1B. Further, non-RF-related energy harvesting may be employed alone or in combination with RF-related energy harvesting. Table 1 summarizes the different combinations of RF bands for DL/UL transmissions and energizing RF signals associated with the embodiments explained above with reference to FIG. 1A and FIG. 1B. The example frequencies provided after the respective RF bands are by way of example only and are not meant to be limiting, as the different frequencies can vary widely and may depend on different technology and protocols now in existence or yet to be developed. For example, in addition to 900 MHz, 2.4 GHz, 5 GHz, and 6 GHz, millimeter wireless also operates in the 57-71 GHz range and any of the RF bands listed in Table 1 could also be within the millimeter wireless range of operation.

In FIG. 1A and FIG. 1B, data can be communicated between the powered wireless device 110, and the AMP device 120 as frames in a request-and-response protocol. The request-and-response protocol can be based on a secret that is shared between the powered wireless device 110 and the AMP device 120, as described above. The secret can be programmed to the powered wireless device 110 and/or the AMP device 120 during manufacturing, or before deployment within an operational network.

In some embodiments, the request-and-response protocol between the powered wireless device 110 and the AMP device 120 is compatible with the carrier sense multiple access with collision avoidance (CSMA/CA) network protocol. In some embodiments, the request-and-response protocol between the powered wireless device 110 and the AMP device 120 is compatible with the request-to-send/clear-to-send (RTS/CTS) network protocol. In some embodiments, the request-and-response protocol between the powered wireless device 110 and the AMP device 120 is compatible with backscattering. Backscattering can refer to conveying information by modulating the channel state information (CSI) and received signal strength indicator (RSSI) measurements received from a sending device (e.g., the powered wireless device 110). A response can be conveyed from the receiving device (e.g., the AMP device 120) back to the sending device (e.g., the powered wireless device 110) by altering the transmitting antenna impedance to transmit data back to the sending device (e.g., the powered wireless device 110). The sending device can detect changes to the wireless channel from the CSI and RSSI values, which can indicate a certain stream of data.

Frames can include information organized into five fields, as shown in Table 2:

TABLE 2

| First Field | Second Field | Third Field | Fourth Field | Fifth Field |
| --- | --- | --- | --- | --- |
| Recipient ID | Sender ID | Frame Type | Data Body | Frame Check Data |

In various embodiments, the first field of the frame includes the recipient ID (e.g., the ID of the powered wireless device 110, or the ID of the AMP device 120). In some embodiments, the recipient ID is the media access control (MAC) address of the recipient device. In alternative embodiments, the recipient ID is a unique, pre-assigned ID, e.g., assigned at manufacturing or before deployment within an operational network. For example, in some embodiments, power harvested by the AMP device 120 is insufficient to perform program operations on non-volatile memory, and the AMP device 120 can have a unique ID programmed into non-volatile memory at an initial factory setup with external power. Requests received at the AMP device 120 can have the ID of the AMP device 120 in the first field. Responses received at the powered wireless device 110 can have the ID of the powered wireless device 110 in the first field. In some embodiments, the recipient ID identifies a particular subset of recipient devices (e.g., multiple AMP devices 120). For example, the recipient ID can be a subset of MAC addresses (e.g., a MAC multicast address) corresponding to the particular subset of AMP devices. In some embodiments, the recipient ID identifies any recipient device (e.g., any AMP device 120) within a wireless connection range of a sender device (e.g., the powered wireless device 110). For example, the recipient ID can be a MAC broadcast address, such as FF:FF:FF:FF:FF:FF.

In various embodiments, the second field of the frame includes the sender ID (e.g., the ID of the powered wireless device 110, or the ID of the AMP device 120). The characteristics of the sender ID can be the same as, or similar to, the characteristics described above with reference to the recipient ID. Requests sent from the powered wireless device 110 can have the ID of the powered wireless device 110 in the second field. Responses sent from the AMP device 120 can have the ID of the AMP device 120 in the second field.

In various embodiments, the third field of the frame includes the frame type, which can identify the type of frame, e.g., ID request frame, ID response frame, data request frame, data response frame. In some embodiments, the frame type identified in the third field is based on or defines information located in the data body of the fourth field.

In various embodiments, the fourth field of the frame includes the data body, which can include frame-exchange parameters, data, commands, authentication and key management (AKM) parameters (e.g., Simultaneous Authentication of Equals (SAE)), cipher suites (e.g., Advanced Encryption Standard (AES), such as AES 1280 bit (AES128)), physical layer (PHY) parameters for guiding frame transmission to reduce conflicts, and session information (e.g., a session number). In some embodiments, some portions of the data body can be secured, such as by encryption or hashing.

In some embodiments, the AKM parameters can include one or more cryptographic parameters. In some embodiments, the AKM parameters include a scalar value that can be an input into an encryption algorithm and an element value that can be an output of the encryption algorithm. In some embodiments, the encryption algorithm is associated with an elliptical curve, where the scalar value denotes a position on the elliptical curve, and the element value represents the position on the elliptical curve that is selected by the scalar value.

In various embodiments, the fifth field of the frame includes frame check data. The frame check data can be any data that can be used by the receiving device (e.g., the powered wireless device 110 or the AMP device 120 respectively) to verify that the frame was received without errors or modification. In some embodiments, the frame check data can include unsecured error check data such as checksum data, cyclic redundancy check (CRC) data, or secured (e.g., encrypted or hashed) error check data such as message integrity code (MIC) data depending on the application and level of network attachment.

Figure 2A:
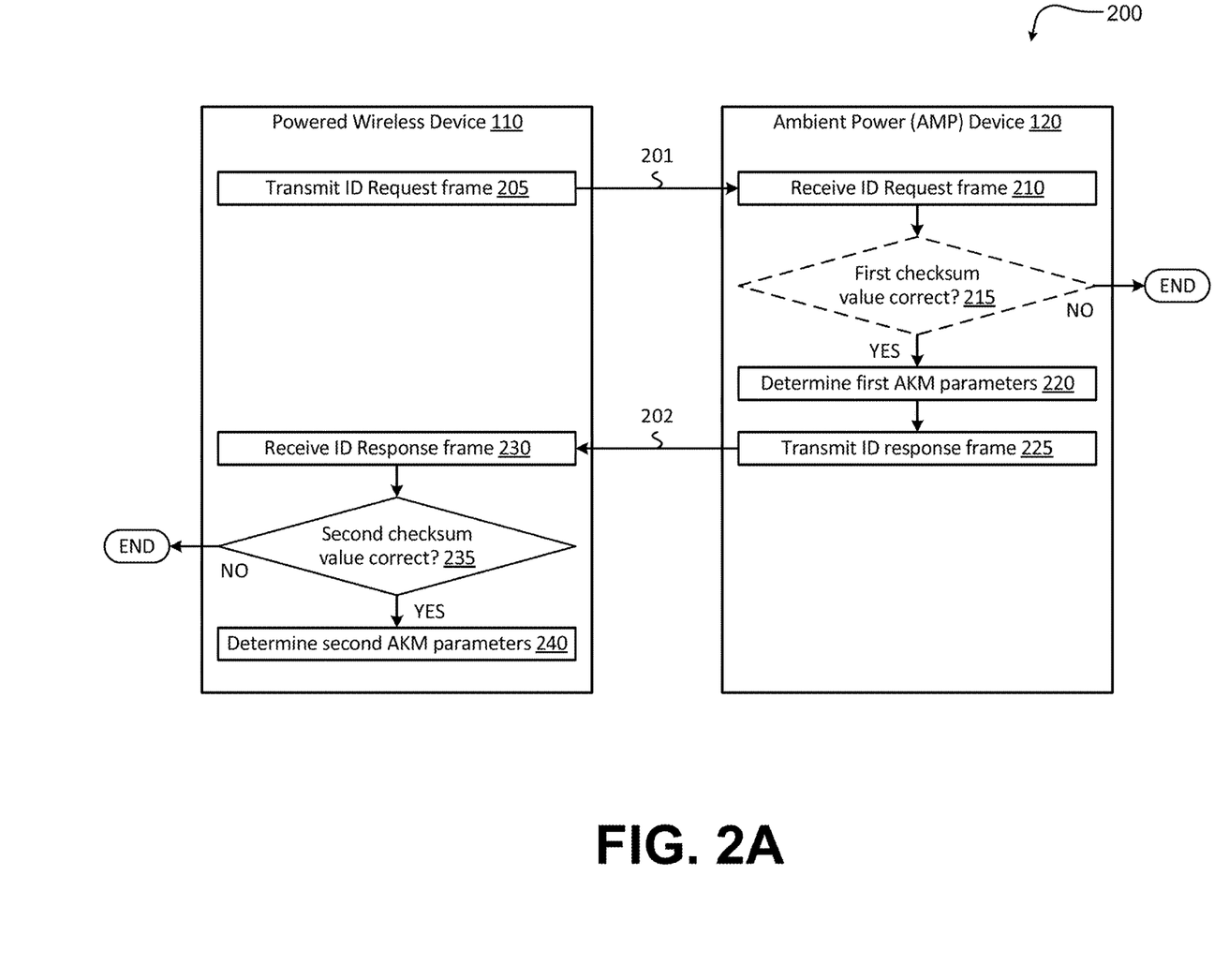
FIG. 2A and FIG. 2B are a flow diagram of an example method for mutual authentication and encryption key generation in wireless AMP devices, according to aspects of the disclosure.
Figure 2B:
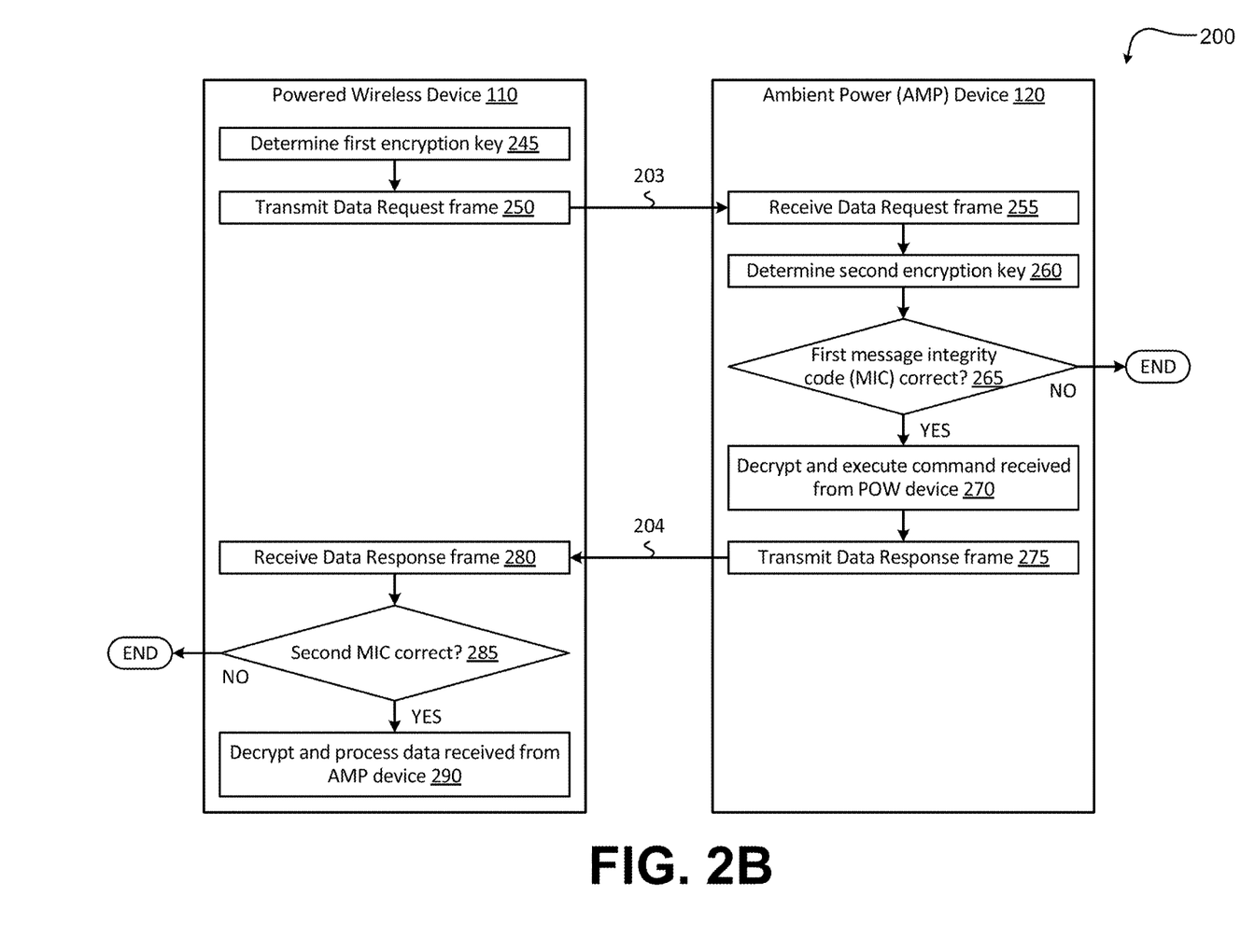

FIG. 2A and FIG. 2B are a flow diagram of an example method 200 for mutual authentication and encryption key generation in wireless AMP devices, according to aspects of the disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 can be performed by processing logic of the powered wireless device 110 and/or the AMP device 120.

At operation 205, the processing logic of the powered wireless device 110 transmits an ID request frame 201 to the AMP device 120 that harvests environmental energy. In some embodiments, the ID request frame 201 includes one or more frame-exchange parameters and a first checksum value. In some embodiments, the frame-exchange parameters include a session number. The session number can be a unique identifier for the communication session that is initiated with by sending the ID request frame 201. If the communication session terminates (e.g., the method 200 ends), the session number can be discarded. Upon re-initiating a communication session with another ID request frame (not illustrated), a new session number can be selected. In some embodiments, the checksum can be replaced with another error-checking value or method, such as a cyclic redundancy check (CRC). In some embodiments, the powered wireless device 110 sends multiple ID request frames 201 on different channels of a wireless network to ascertain the working channel of the AMP device 120. In some embodiments, the frame-exchange parameters include a cipher type (e.g., a cipher suite). The cipher type can be associated with an authentication and key management (AKM) method. In some embodiments, the cipher type is associated with a cipher algorithm. The AMP device 120 can select the AKM method. In some embodiments, the powered wireless device 110 selects the AKM method.

At operation 210, the processing logic of the AMP device 120 receives the ID request frame 201 from the powered wireless device 110.

At operation 215, the processing logic of the AMP device 120 verifies whether the first checksum value of the received ID request frame 201 is correct. The operation 215 is an optional operation (as indicated in FIG. 2A with dashed lines) that can be performed if the ID request frame includes a checksum value. If the ID request frame does not include a checksum value, the processing logic can proceed from the operation 210 to the operation 220 (below). If the first checksum is not correct, the method 200 ends, e.g., the processing logic of the AMP device 120 terminates a procedure of establishing an authenticated and encrypted network session with the powered wireless device. If the first checksum value is correct, the processing logic of the AMP device 120 proceeds to operation 220. In embodiments where another error-checking value or method is used in place of the checksum, the corresponding error correction value can be verified accordingly.

At operation 220, the processing logic of the AMP device 120 determines first AKM parameters for the AMP device 120. In some embodiments, the first AKM parameters are determined based on the secret that is shared between the AMP device 120 and the powered wireless device 110. In some embodiments, the first AKM parameters include a first scalar value and a first element value. The first scalar value can be a value selected by the AMP device 120 and used as input to a cryptographic algorithm to produce the first element value.

In some embodiments, the first AKM parameters can be selected based on one or more AKM methods. In some embodiments, the AMP device 120 can select an AKM method for the secure communication session. For example, in response to receiving an ID request frame 201, the processing logic of the AMP device 120 can select an AKM method for which to determine first AKM parameters (e.g., prior to or while performing operation 220). In some embodiments, the AMP device 120 is pre-programmed to operate with a specific AKM method. AKM methods can include one or more of a password-based challenge and response, simultaneous authentication of equals (SAE), public/private key trust method (e.g., using security certificates), or the like. In some embodiments, the AKM method is based on a cipher block, where data is encrypted in fixed-size blocks (e.g., 64 bits, 128 bits, etc.) Plaintext is divided into blocks and each block is independently encrypted using the same encryption key, where each the encryption of each block can be dependent on the encryption of a previous block. In alternative embodiments, the AKM method is based on a cipher stream, where data is encrypted bit by bit. Plaintext is combined with a pseudorandom stream of bits (e.g., cyphertext) using a bitwise exclusive-or (XOR) function.

At operation 225, the processing logic of the AMP device 120 transmits an ID response frame 202 to the powered wireless device 110. In some embodiments, the ID response frame 202 includes at least one of the one or more frame-exchange parameters, the one or more first AKM parameters, and a second checksum value. In some embodiments, the frame-exchange parameters can include the session number (e.g., the session number of operation 205). In some embodiments, the one or more first AKM parameters included in the ID response 202 are a first scalar value and a first element value.

At operation 230, the processing logic of the powered wireless device 110 receives an ID response frame 202 from the AMP device 120.

At operation 235, the processing logic of the powered wireless device 110 verifies whether the second checksum value of the received ID response frame 202 is correct. If the second checksum value is not correct, the method 200 ends, e.g., the processing logic of the powered wireless device 110 terminates a procedure of establishing an authenticated and encrypted network session with the powered wireless device. If the second checksum value is correct, the processing logic of the powered wireless device 110 proceeds to operation 240.

At operation 240, the processing logic of the powered wireless device 110 determines second AKM parameters for the powered wireless device 110. In some embodiments, the second AKM parameters are determined based on the first AKM parameters (e.g., received in the ID response frame 202 from the AMP device 120) and the secret that is shared between the powered wireless device 110 and the AMP device 120.

At operation 245, the processing logic of the powered wireless device 110 determines a first encryption key for the powered wireless device 110. In some embodiments, the first encryption key for the powered wireless device 110 is determined from the second AKM parameters for the powered wireless device 110.

At operation 250, the processing logic of the powered wireless device 110 transmits a data request frame 203 to the AMP device 120. In some embodiments, the data request frame 203 includes at least one of the one or more frame-exchange parameters, the one or more second AKM parameters, a first message integrity code (MIC), and a command. In some embodiments, processing logic of the powered wireless device 110 encrypts the first MIC using a first portion of the first encryption key. In some embodiments, the command is encrypted. In some embodiments, processing logic of the powered wireless device 110 encrypts the command using a second portion of the first encryption key.

At operation 255, the processing logic of the AMP device 120 receives the data request frame 203 from the powered wireless device 110.

At operation 260, the processing logic of the AMP device 120 determines a second encryption key for the AMP device 120. In some embodiments, the second encryption key for the AMP device 120 is determined from information received in the data request frame 203. In some embodiments, the second encryption key for the AMP device 120 is determined from the first AKM parameters of the AMP device 120 and the second AKM parameters of the powered wireless device 110.

At operation 265, the processing logic of the AMP device 120 verifies whether the first message integrity code (MIC) of the data request frame 203 is correct. If the first MIC is not correct, the method 200 ends, e.g., the processing logic of the AMP device 120 terminates an encrypted network session initiated with the powered wireless device 110. If the first MIC is correct, the processing logic of the AMP device 120 proceeds to operation 270. In some embodiments, the processing logic of the AMP device 120 uses a first portion of the second encryption key to verify whether the first MIC is correct. That is, the processing logic of the the AMP device can decrypt the first MIC using the first portion of the second encryption key.

At operation 270, the processing logic of the AMP device 120 decrypts the encrypted command received from the powered wireless device 110 to generate a decrypted command. Also at operation 270, the processing logic of the AMP device 120 executes the decrypted command, which may include generating a data response frame 204. In some embodiments, the processing logic of the AMP device 120 uses a second portion of the second encryption key to decrypt the encrypted command received in the data request frame 203.

At operation 275, the processing logic of the AMP device 120 transmits a data response frame 204 to the powered wireless device 110. In some embodiments, the data response frame 204 includes at least one of the one or more frame-exchange parameters, a second MIC, and data including at least one of status or environmental data retrieved from a coupled sensor (or the like). In some embodiments, the processing logic of the AMP device 120 encrypts the second MIC using a first portion of the second encryption key. In some embodiments, the data is encrypted. In some embodiments, the processing logic of the AMP device 120 encrypts the data using a second portion of the second encryption key.

At operation 280, the processing logic of the powered wireless device 110 receives the data response frame 204 from the AMP device 120.

At operation 285, the processing logic of the powered wireless device 110 verifies whether the second MIC of the data response frame 204 is correct. If the second MIC is not correct, the method 200 ends, e.g., the processing logic of the powered wireless device 110 terminates the encrypted network session with the AMP device 120. If the second MIC is correct, processing logic of the powered wireless device 110 proceeds to operation 290. In some embodiments, the processing logic of the powered wireless device 110 uses a first portion of the first encryption key to verify whether the second MIC is correct. That is, the processing logic of the powered wireless device 110 can decrypt the second MIC using the first portion of the first encryption key.

At operation 290, the processing logic of the powered wireless device 110 decrypts the encrypted data received from the AMP device 120 to generated decrypted data. Also at operation 290, the processing logic of the powered wireless device 110 processes the decrypted data received from the AMP device 120 in the data response frame 204. In some embodiments, the processing logic of the powered wireless device 110 uses a second portion of the first encryption key to decrypt the encrypted data received in the data response frame 204.

In some embodiments, the processing logic of the powered wireless device 110 determines whether to request additional data from the AMP device 120 (not illustrated). Upon determining to request additional data from the AMP device 120, the processing logic of the powered wireless device 110 can transmit a second data request frame (not illustrated) to the AMP device 120 e.g., similar to operation 250. The second data request frame can include at least one of the one or more frame-exchange parameters, a third MIC, and a second command. The processing logic of the AMP device 120 can receive the second data request frame, and verify whether the third MIC of the second data request frame is correct e.g., similar to operations 255 and 265, respectively. If the MIC is not correct, the method 200 ends e.g., the processing logic of the AMP device 120 terminates the encrypted network session initiated with the powered wireless device 110. If the third MIC is correct, the processing logic of the AMP device 120 can decrypt and execute the command received in the second data request, e.g., similar to operation 270. The processing logic of the AMP device 120 can transmit a second data response frame (not illustrated) to the powered wireless device 110. The second data response frame can include at least one of the one or more frame-exchange parameters a fourth MIC, and second data. The processing logic of the powered wireless device 110 can receive the second data response frame, and verify whether the fourth MIC of the second data response frame is correct, e.g., similar to operations 280 and 285, respectively. If the MIC is not correct, the method 200 ends, e.g., the processing logic of the powered wireless device 110 terminates the encrypted network session initiated with the AMP device 120. If the fourth MIC is correct, the processing logic of the powered wireless device 110 can decrypt and process the data received in the second data response frame, e.g., similar to operation 290. In some embodiments, additional data responses and corresponding data requests can be transmitted and received until the powered wireless device 110 determines that no more data is to be collected, the AMP device 120 loses power, or the communication session otherwise terminates, e.g., the method 200 ends.

Figure 3:
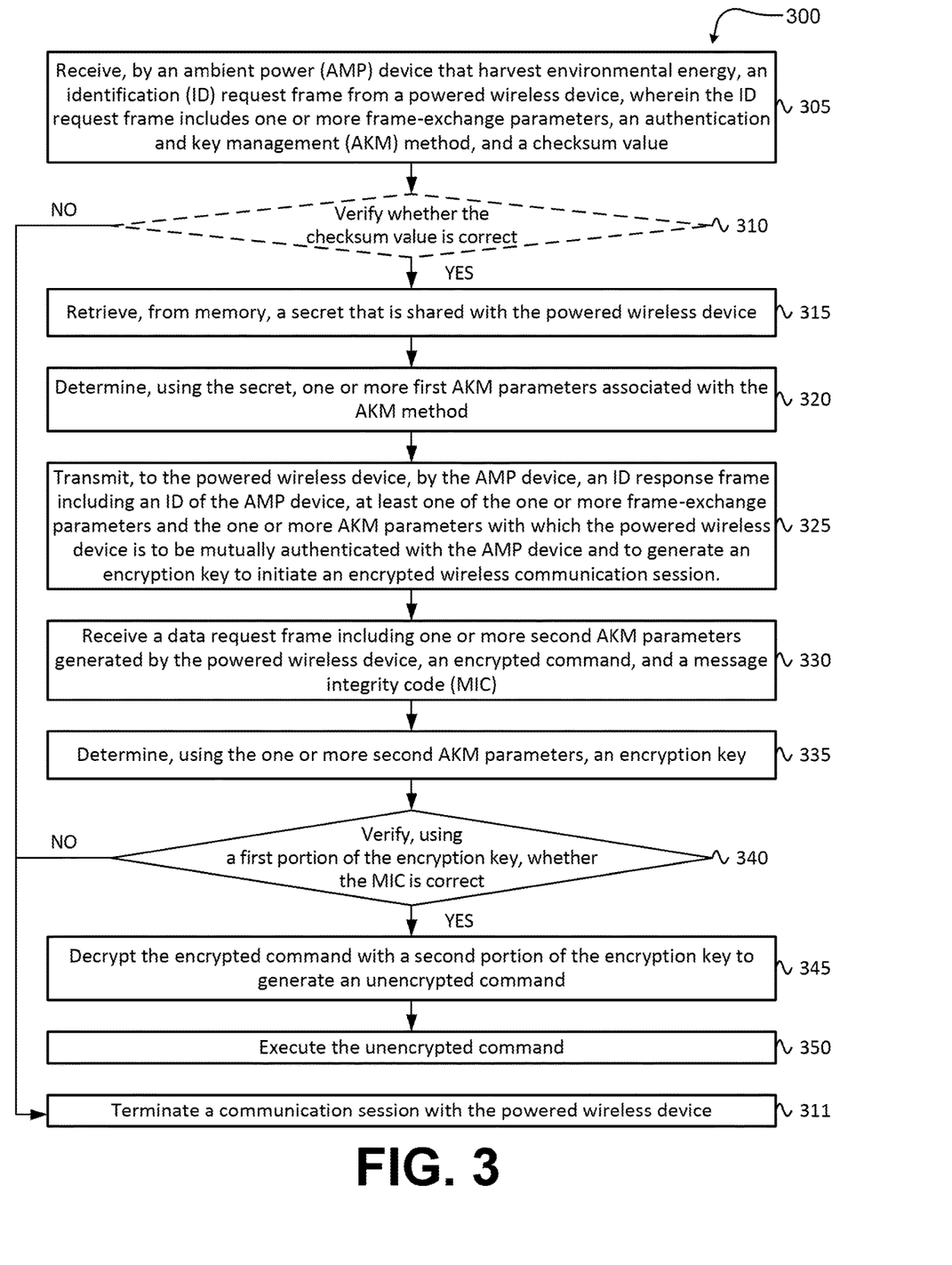
FIG. 3 is a flow diagram of a method for mutual authentication and encryption key generation in AMP devices, according to aspects of the disclosure.

FIG. 3 is a flow diagram of a method 300 for mutual authentication and encryption key generation in AMP devices, according to aspects of the disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 can be performed by the wireless network 100A or wireless network 100B, e.g., processing logic of the AMP device 120.

At operation 305, the processing logic causes the AMP device 120 to receive an identification (ID) request frame from a powered wireless device. The ID request frame can include one or more frame-exchange parameters, and an authentication and key management (AKM) method. In some embodiments, the one or more frame-exchange parameters include a frame type, a session number, and physical layer (PHY) parameters. In some embodiments, the processing logic uses the PHY parameters to time the transmission of the ID response frame so that the ID response frame is deconflicted with ID response frame transmissions from multiple other AMP devices. In some embodiments, the processing logic causes the AMP device 120 to receive the ID request and/or causes the AMP device 120 to perform subsequent operations (e.g., operations 310-355). The AKM method can be used by the processing logic to determine which type of AKM parameters should be generated in subsequent operations (e.g., see operation 320, below). In some embodiments, the ID request frame can further include a frame type. In some embodiments, the ID request frame can further include a checksum.

At operation 310, the processing logic verifies whether the checksum value is correct. The operation 310 is an optional operation (as indicated in FIG. 3 with dashed lines) that can be performed if the ID request frame includes a checksum value. If the ID request frame does not include a checksum value, the processing logic can proceed from the operation 305 to the operation 315 (below). If the checksum value is correct, the processing logic proceeds to operation 315. If the checksum value is not correct, the processing logic proceeds to operation 355, where the communication session with the powered wireless device 110 can be terminated. In some embodiments at operation 355, responsive to failing to verify the checksum value, the processing logic terminates a procedure of establishing an authenticated and encrypted network session with the powered wireless device.

At operation 315, the processing logic retrieves, from memory, a secret that is shared with the powered wireless device (e.g., a secret that is shared between the AMP device and the powered wireless device). In some embodiments, the secret describes an elliptical curve.

At operation 320, the processing logic determines, using the secret, one or more authentication and key management (AKM) parameters associated with the AKM method. In some embodiments, the AKM method can include one or more of a Simultaneous Authentication of Equals (SAE) method, a password-based challenge, or an ID of type of encryption (e.g., information regarding an encryption type). In some embodiments where the secret describes an elliptical curve, the one or more AKM parameters include a scalar value corresponding to a random, or pseudo-random number and an element value corresponding to a location along the elliptical curve selected using the scalar value (e.g., the random or pseudo-random number).

At operation 325, the processing logic causes the AMP device 120 to transmit, to the powered wireless device 110, an ID response frame including an ID of the AMP device, at least one of the one or more frame-exchange parameters and the one or more AKM parameters with which the powered wireless device is to be mutually authenticated with the AMP device and to generate an encryption key to initiate an encrypted wireless communication session.

At operation 330, the processing logic causes the AMP device 120 to receive a data request frame. In some embodiments, the data request frame includes one or more second AKM parameters generated by the powered wireless device, an encrypted command, and a message integrity code (MIC).

At operation 335, the processing logic determines, using the one or more second AKM parameters, an encryption key.

At operation 340, the processing logic verifies, using a first portion of the encryption key, whether the MIC is correct. If the MIC is correct, processing logic proceeds to operation 345. If the MIC is not correct, processing logic proceeds to operation 355, where the communication session with the powered wireless device can be terminated. In some embodiments, at operation 355, responsive to failing to verify the MIC with a first portion of the encryption key, processing logic terminates an encrypted network session initiated with the powered wireless device 110.

At operation 345, the processing logic decrypts the encrypted command with a second portion of the encryption key to generate a decrypted command.

At operation 350, the processing logic executes the decrypted command. In some embodiments, to execute the encrypted command processing logic generates a data response frame and causes the data response frame to be transmitted to the powered wireless device. The data response frame can include encrypted data. In some embodiments, the encrypted data can include at least one of a status or environmental data retrieved from a coupled sensor. In some embodiments, the data response frame can include a second MIC.

Figure 4:
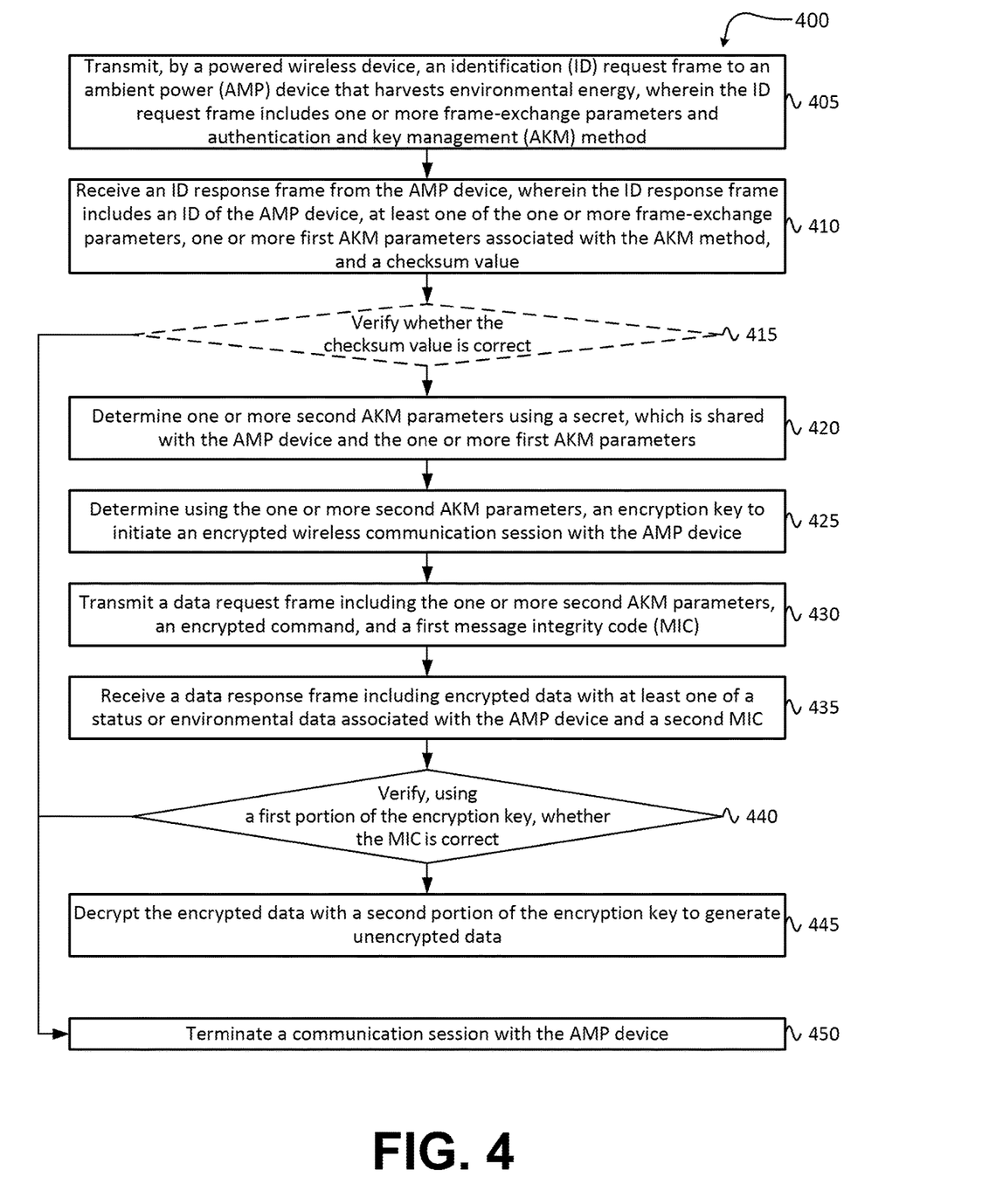
FIG. 4 is a flow diagram of a method for mutual authentication and encryption key generation in AMP devices, according to aspects of the disclosure.

FIG. 4 is a flow diagram of a method 400 for mutual authentication and encryption key generation in AMP devices, according to aspects of the disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. The method 400 can be performed by the wireless network 100A or wireless network 100B, e.g., processing logic of the powered wireless device 110.

At operation 405, the processing logic causes the powered wireless device 110 to transmit an identification (ID) request frame to an ambient power (AMP) device that harvest environmental energy. The ID request frame can include one or more frame exchange parameters and an authentication and key management (AKM) method. In some embodiments, the one or more frame-exchange parameters can include a frame type, a session number, and physical layer (PHY) parameters. In some embodiments, the one or more frame-exchange parameters include a first AMP device identifier corresponding to a first AMP device of many AMP devices. In some embodiments, the one or more frame-exchange parameters include a broadcast value comprising an identifier corresponding to multiple AMP devices that include the AMP device. The ID request can further include an authentication and key management (AKM) method. In some embodiments, processing logic can use the AKM method to determine which AKM parameters to generate in subsequent operations (e.g., operation 420, below). In some embodiments, the ID request frame can further include a checksum value. In some embodiments, the processing logic causes the powered wireless device 110 to transmit the ID request and/or causes the powered wireless device 110 to perform subsequent operations (e.g., operation 410-450).

At operation 410, the processing logic receives an ID response frame from the AMP device. In some embodiments the ID response frame includes at least one of the one or more frame-exchange parameters, and one or more first AKM parameters. In some embodiments, the one or more first AKM parameters are associated with the AKM method. In some embodiments, the ID response frame further includes a checksum value.

At operation 415, the processing logic verifies whether the checksum value is correct. Operation 415 is an optional operation (as indicated in FIG. 4 with dashed lines) that can be performed if the ID response frame includes a checksum value. If the ID response frame does not include a checksum value, the processing logic can proceed from the operation 410 to the operation 420. If the checksum value is correct, the processing logic proceeds to operation 420. If the checksum value is not correct, the processing logic proceeds to operation 450, where the communication session with the AMP device can be terminated. In some embodiments at operation 450, responsive to failing to verify the checksum value, the processing logic terminates a procedure of establishing an authenticated and encrypted network session with the powered wireless device.

At operation 420, the processing logic determines one or more second AKM parameters using a secret which is shared with the AMP device and the one or more first AKM parameters. In some embodiments, the one or more second AKM parameters are associated with the AKM method. In some embodiments, the secret describes an elliptical curve.

At operation 425, the processing logic determines using the one or more second AKM parameters, an encryption key for an encrypted wireless communication session with the AMP device. In some embodiments, the one or more AKM parameters include one or more of Simultaneous Authentication of Equals (SAE) information, a password-based challenge, an ID, or information for another type of encryption. In some embodiments where the secret describes an elliptical curve, the one or more AKM parameters include a scalar value corresponding to a random, or pseudo-random number and an element value corresponding to a location along the elliptical curve selected using the scalar value (e.g., the random or pseudo-random number).

At operation 430, the processing logic causes the powered wireless device 110 to transmit, to the AMP device 110 a data request frame including at least one of the one or more frame-exchange parameters, the one or more second AKM parameters, an encrypted command, and a first message integrity code (MIC).

At operation 435, the processing logic causes the powered wireless device 110 to receive a data response frame. In some embodiments, the data response frame includes encrypted data with at least one of a status or environmental data associated with the AMP device, and a second MIC.

At operation 440, the processing logic verifies using a first portion of the encryption key, whether the second MIC is correct. If the second MIC is correct, processing logic proceeds to operation 445. If the second MIC is not correct, processing logic proceeds to operation 450, where the communication session with the powered wireless device can be terminated. In some embodiments, at operation 450, responsive to failing to verify the MIC with a first portion of the encryption key, processing logic terminates an encrypted network session initiated with the AMP device 120.

At operation 445, the processing logic decrypts the encrypted data with a second portion of the encryption key to generate decrypted data. In some embodiments, processing logic can cause a second data request frame to be transmitted to the AMP device 120. The second data request frame can include a second decrypted command and a third MIC. The processing logic can cause a second data response frame to be received. The second data response frame can include encrypted data reflecting at least a second status or environmental data associated with the AMP device 120 and a fourth MIC. The processing logic can verify the fourth MIC with the first portion of the encryption key, and decrypt the second encrypted data with the second portion of the encryption key to generate second decrypted data, similar to operations described herein above.

In some embodiments, first encrypted data can include a first portion of data collected by a sensor coupled to the AMP device 120, and second encrypted data can include a second portion of the data collected by the sensor. In some embodiments, first encrypted data can include data of a first type collected by a sensor coupled to the AMP device (e.g., temperature data), and second encrypted data can include data of a second type collected by the sensor (e.g., pressure data).

Figure 5:
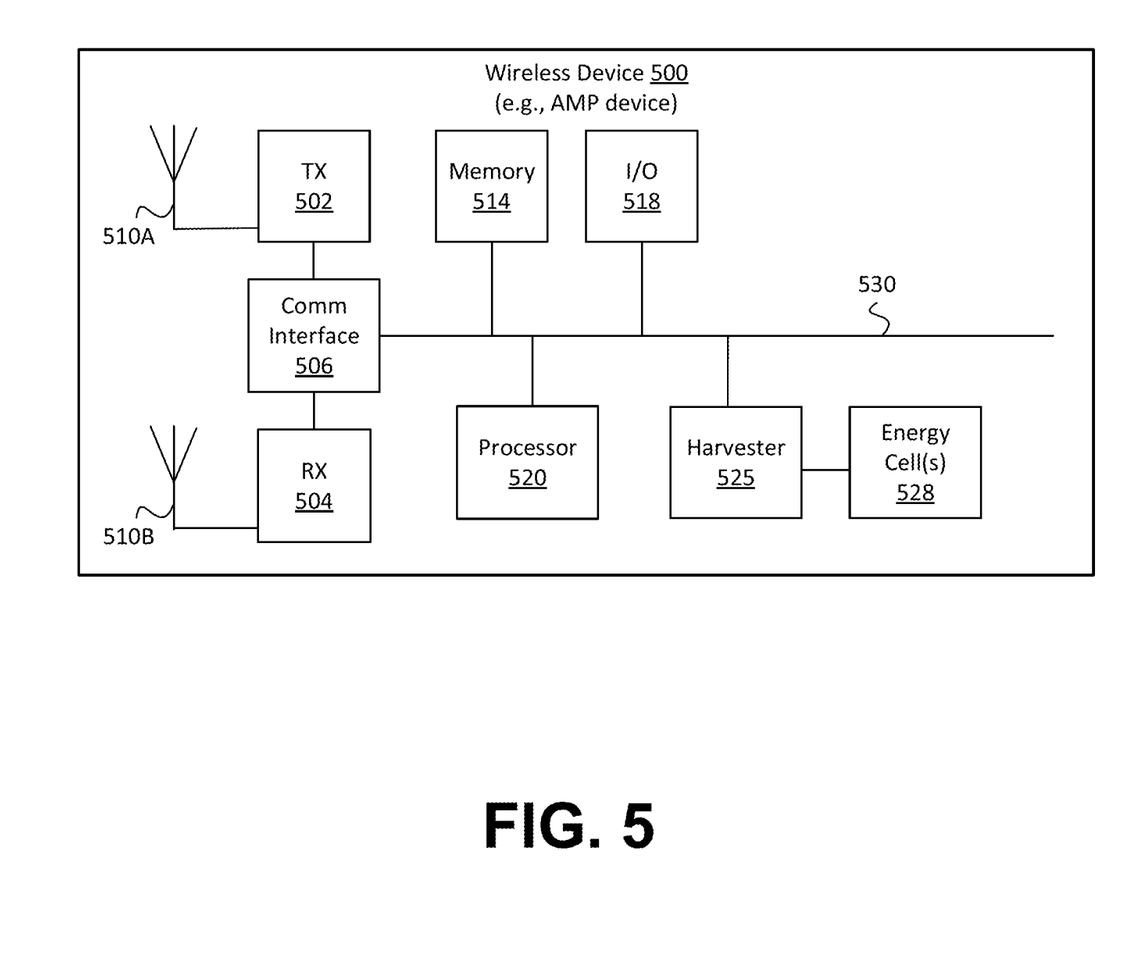
FIG. 5 is a simplified block diagram of an example wireless device 500, which may represent any of the powered wireless device 110 or client wireless devices discussed herein according to aspects of the disclosure.

FIG. 5 is a simplified block diagram of an example wireless device 500, which may represent any of the powered wireless device 110 or client wireless devices discussed herein according to aspects of the disclosure. For example, the client wireless devices may include the AMP device 120. In at least some embodiments, the wireless device 500 includes, but is not be limited to, a transmitter 502 or TX (e.g., a WLAN transmitter), a receiver 504 or RX (e.g., a WLAN receiver), a communications interface 506, a TX antenna 510A coupled to the transmitter 502, an RX antenna 510B coupled to the receiver 504, a memory 514, one or more input/output (I/O) devices 518 (such as a display screen, a touch screen, a keypad, and the like), a processor 520, an energy harvester 525, and energy cells 528. These components can all be coupled to a communications bus 530. In some embodiments, aspects of the communication interface 506 work with the processor 520 to perform operations or that function as a processing device of the wireless device 500. In some embodiments, there is a single antenna and multiplexing logic to switch use of the antenna between the TX and RX. In some embodiments, the powered wireless device 110 has no energy harvester, and instead has a battery and/or is analog current (AC)-powered.

In at least some embodiments, the memory 514 includes storage to store instructions executable by the processor 520 and/or data generated by the communication interface 506. In various embodiments, frontend components such as the transmitter 502, the receiver 504, the communication interface 506, and one or more antennas are adapted with or configured for WLAN and WLAN-based frequency bands, e.g., Wi-Fi®, Bluetooth® (BT), Bluetooth® Low Energy (LBE), Ultra-Wideband (UWB), Z-Wave™, Zigbee®, LoRa™, Wireless Smart Utility Network @(Wi-SUN®), or other wireless protocol. While some of the protocols may also be referred to as personal area network (PAN) technology, for simplicity, all are broadly referred to as WLAN technology. Future protocols are also envisioned.

In various embodiments, the communications interface 506 is integrated with the transmitter 502 and the receiver 504, e.g., as a frontend of the wireless device 500. The communication interface 506 may coordinate, as directed by the processor 520, to request/receive packets from other wireless devices or those that reflect off of objects. The communications interface 506 can further process data symbols received by the receiver 504 in a way that the processor 520 can perform further processing, including identifying and parsing data packets received within the wireless signals. In some embodiments, the transmitter 502, receiver 504, communication interface 506, and antennas 510A and 510B can be referred to herein as a "wireless communication circuit."

In various embodiments, the energy harvester 525 performs operations disclosed herein in order to capture electromagnetic or RF signals and other types of non-RF energy, e.g., light, temperature gradients, pressure differential, mechanical vibrations, wind energy, and the like, which were discussed with referenced to FIG. 1A and FIG. 1B. As discussed, the energy harvester 525, with reference to harvesting energy from RF wireless signals, may be a multi-band harvester in being configured to harvest energy from multiple ranges of frequencies that define different RF bands. In these embodiments, the energy harvester 525 is also configured to store the harvested energy within the energy cells 528, which then operate as a power source for the wireless device 500.

It will be apparent to one skilled in the art that at least some embodiments may be practiced without these specific details. In other instances, well-known components, elements, or methods are not described in detail or are presented in a simple block diagram format in order to avoid unnecessarily obscuring the subject matter described herein. Thus, the specific details set forth hereinafter are merely exemplary. Particular implementations may vary from these exemplary details and still be contemplated to be within the spirit and scope of the present embodiments.

Reference in the description to "an embodiment," "one embodiment," "an example embodiment," "some embodiments," and "various embodiments" means that a particular feature, structure, step, operation, or characteristic described in connection with the embodiment(s) is included in at least one embodiment. Further, the appearances of the phrases "an embodiment," "one embodiment," "an example embodiment," "some embodiments," and "various embodiments" in various places in the description do not necessarily all refer to the same embodiment(s).

The description includes references to the accompanying drawings, which form a part of the detailed description. The drawings show illustrations in accordance with exemplary embodiments. These embodiments, which may also be referred to herein as "examples," are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

The description includes references to the accompanying drawings, which form a part of the detailed description. The drawings show illustrations in accordance with exemplary embodiments. These embodiments, which may also be referred to herein as "examples," are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

Certain embodiments may be implemented by firmware instructions stored on a non-transitory computer-readable medium, e.g., such as volatile memory and/or non-volatile memory. These instructions may be used to program and/or configure one or more devices that include processors (e.g., CPUs) or equivalents thereof (e.g., such as processing cores, processing engines, microcontrollers, and the like), so that when executed by the processor(s) or the equivalents thereof, the instructions cause the device(s) to perform the described operations for Universal Serial Bus (USB) Type-C (USB-C) or USB Power Delivery (PD) mode-transition architecture described herein. The non-transitory computer-readable storage medium may include, but is not limited to, electromagnetic storage medium, read-only memory (ROM), random-access memory (RAM), erasable programmable memory (e.g., Erasable and Programmable Read Only Memory (EPROM) and Electrically Erasable and Programmable Read Only Memory (EEPROM)), flash memory, or another now-known or later-developed non-transitory type of medium that is suitable for storing information.

Although the operations of the circuit(s) and block(s) herein are shown and described in a particular order, in some embodiments the order of the operations of each circuit/block may be altered so that certain operations may be performed in an inverse order or so that certain operation may be performed, at least in part, concurrently and/or in parallel with other operations. In other embodiments, instructions or sub-operations of distinct operations may be performed in an intermittent and/or alternating manner.

In the foregoing specification, the disclosure has been described with reference to specific exemplary embodiments thereof. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense.

What is claimed is:

1. A method comprising:
receiving, by an ambient power (AMP) device that harvests environmental energy, an identification (ID) request frame from a powered wireless device, wherein the ID request frame includes one or more frame-exchange parameters, and an authentication and key management (AKM) method;
retrieving, from memory, a secret that is shared with the powered wireless device;
determining, using the secret, one or more first AKM parameters associated with the AKM method; and
transmitting, to the powered wireless device, by the AMP device, an ID response frame comprising an ID of the AMP device, at least one of the one or more frame-exchange parameters, and the one or more first AKM parameters with which the powered wireless device is to be mutually authenticated with the AMP device and to generate an encryption key to initiate an encrypted wireless communication session.

2. The method of claim 1, wherein the one or more frame-exchange parameters include at least one of a frame type, a session number, a cipher type, or physical layer (PHY) parameters.

3. The method of claim 1, wherein the one or more frame-exchange parameters include physical layer (PHY)

parameters, the method further comprising using the PHY parameters to time transmitting the ID response frame so that the ID response frame is deconflicted with ID response frame transmissions by a plurality of other AMP devices.

4. The method of claim 1, wherein the ID response frame also comprises a frame type, and wherein the one or more first AKM parameters comprise one or more of Simultaneous Authentication of Equals (SAE) information, a password-based challenge, or an ID of a type of encryption.

5. The method of claim 1, wherein the secret describes an elliptical curve, and wherein the one or more first AKM parameters includes a scalar value comprising a random number and an element value comprising a location along the elliptical curve selected using the random number.

6. The method of claim 1, wherein the ID request frame further includes a checksum value, the method further comprising;
verifying that the checksum value is correct; and
in response to failing to verify the checksum value, terminating a procedure of establishing an authenticated and encrypted network session with the powered wireless device.

7. The method of claim 1, further comprising:
receiving a data request frame including one or more second AKM parameters generated by the powered wireless device, an encrypted command, and a message integrity code (MIC);
determining an encryption key using the one or more first AKM parameters and the one or more second AKM parameters;
verifying the MIC with a first portion of the encryption key;
decrypting the encrypted command with a second portion of the encryption key to generate a decrypted command; and
executing the decrypted command.

8. The method of claim 7, wherein executing the encrypted command causes generating and transmitting a data response frame to the powered wireless device, the data response frame comprising encrypted data including at least one of status or environmental data retrieved from a coupled sensor.

9. The method of claim 1, further comprising:
receiving a data request frame including one or more second AKM parameters generated by the powered wireless device, an encrypted command, and a message integrity code (MIC);
determining an encryption key using the one or more second AKM parameters;
failing to verify the MIC with a portion of the encryption key; and
terminating an encrypted network session initiated with the powered wireless device.

10. A method comprising:
transmitting, by a powered wireless device, an identification (ID) request frame to an ambient power (AMP) device that harvests environmental energy, wherein the ID request frame includes one or more frame-exchange parameters and an authentication and key management (AKM) method;
receiving an ID response frame from the AMP device, wherein the ID response frame comprises an ID of the AMP device, at least one of the one or more frame-exchange parameters, one or more first AKM parameters associated with the AKM method;

determining one or more second AKM parameters using a secret, which is shared with the AMP device, and the one or more first AKM parameters; and
determining, using the one or more second AKM parameters, an encryption key to initiate an encrypted wireless communication session with the AMP device.

11. The method of claim 10, wherein the one or more frame-exchange parameters include at least one of a frame type, a session number, a cipher type, or physical layer (PHY) parameters.

12. The method of claim 10, wherein the one or more frame-exchange parameters include a first AMP device identifier corresponding to the ID of the AMP device of a plurality of AMP devices.

13. The method of claim 10, wherein the one or more frame-exchange parameters include a broadcast value comprising an identifier corresponding to a plurality of AMP devices that includes the AMP device.

14. The method of claim 10, wherein the secret describes an elliptical curve, and wherein the one or more second AKM parameters comprises a scalar value comprising a random number and an element value comprising a location along the elliptical curve selected using the random number.

15. The method of claim 10, wherein the ID response frame further comprises a checksum value, the method further comprising:
verifying the checksum value is correct; and
in response to failing to verify the checksum value, terminating a procedure of establishing an authenticated and encrypted network session with the AMP device.

16. The method of claim 10, further comprising:
transmitting a data request frame including the one or more second AKM parameters, an encrypted command, and a first message integrity code (MIC);
receiving a data response frame comprising encrypted data including at least one of a status or environmental data associated with the AMP device and a second MIC;
verifying the second MIC with a first portion of the encryption key; and
decrypting the encrypted data with a second portion of the encryption key to generate decrypted data.

17. The method of claim 16, wherein the data request frame also includes a frame type, and wherein the one or more second AKM parameters comprise one or more of Simultaneous Authentication of Equals (SAE) information, a password-based challenge, or an ID of a type of encryption.

18. The method of claim 16, further comprising:
transmitting a second data request frame including a second encrypted command and a third MIC;
receiving a second data response frame comprising second encrypted data including at least one of a second status or environmental data associated with the AMP device and a fourth MIC;
verifying the fourth MIC with the first portion of the encryption key; and
decrypting the second encrypted data with the second portion of the encryption key to generate second decrypted data.

19. The method of claim 10, further comprising:
transmitting a data request frame comprising the one or more second AKM parameters, an encrypted command, and a message integrity code (MIC);

receiving a data response frame comprising encrypted data including at least one of a status or environmental data retrieved from a coupled sensor and a second MIC;

failing to verify the MIC with a first portion of the encryption key; and terminating an encrypted network session with the AMP device.

20. A wireless device comprising:

an ambient power (AMP) collection circuit configured to harvest environmental energy;

a wireless communication circuit;

a memory; and a processing device coupled to the memory, the AMP collection circuit, and the wireless communication circuit, the processing device to:

receive, at the wireless communication circuit, an identification (ID) request frame from a powered wireless device, wherein the ID request frame includes one or more frame-exchange parameters, and an authentication and key management (AKM) method;

retrieve, from the memory, a secret that is shared with the powered wireless device;

determine, using the secret, one or more AKM parameters associated with the AKM method; and    transmit, to the powered wireless device, by the wireless communication circuit, an ID response frame comprising an ID of the AMP device, at least one of the one or more frame-exchange parameters and the one or more AKM parameters with which the powered wireless device is to be mutually authenticated with the AMP device and to generate an encryption key to initiate an encrypted wireless communication session.

* * * * *